April 23, 1935.  B. H. DICKS  1,998,535
ROUTE INDICATOR FOR MOTOR VEHICLES
Filed July 25, 1934  3 Sheets-Sheet 1
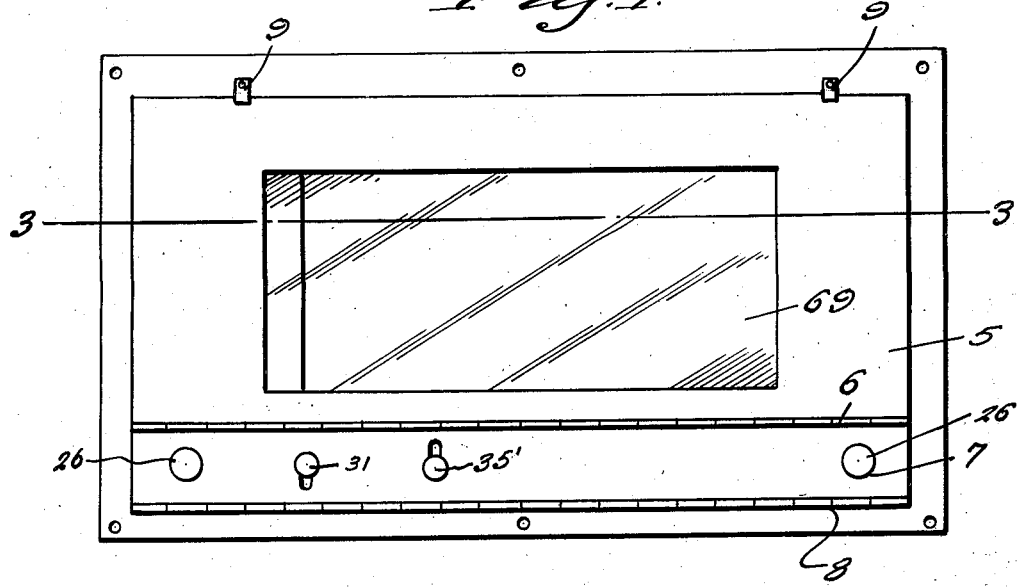
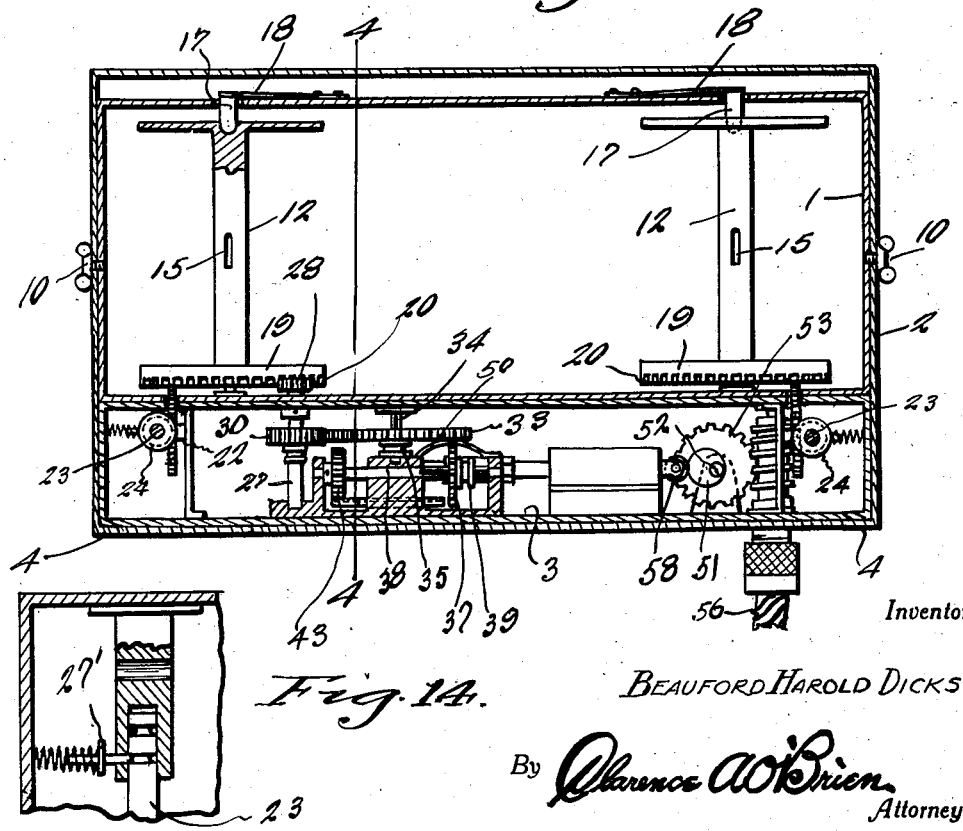
Inventor
BEAUFORD HAROLD DICKS
By Clarence A. O'Brien
Attorney

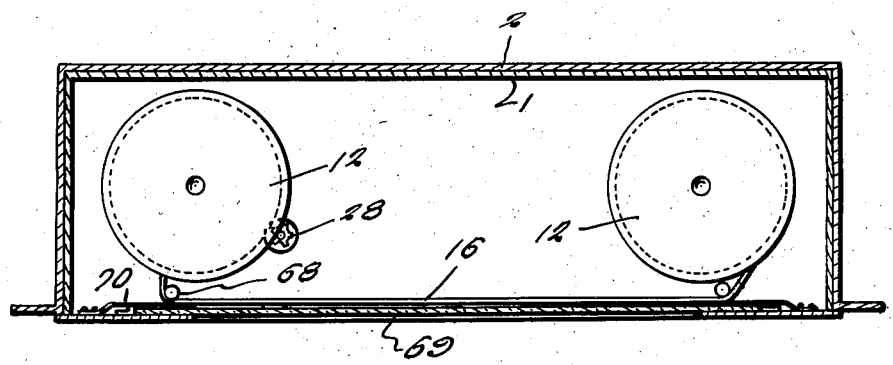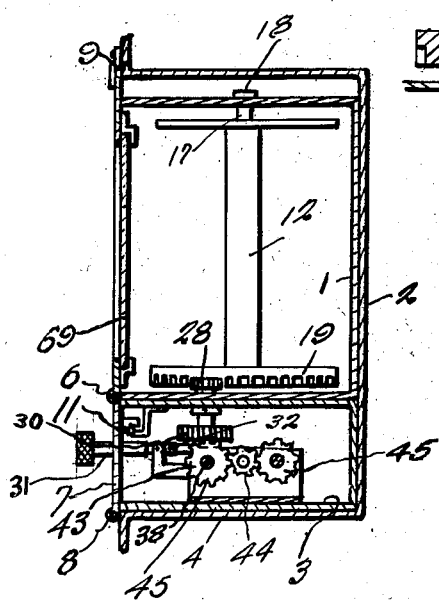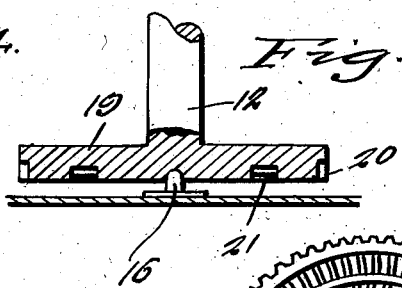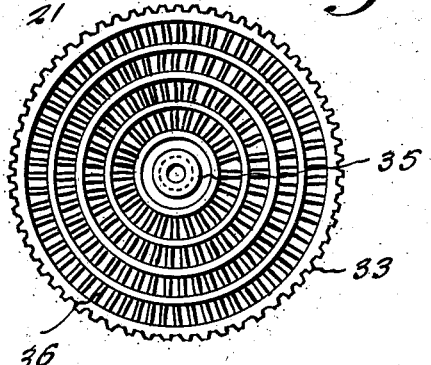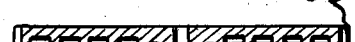

April 23, 1935.  B. H. DICKS  1,998,535
ROUTE INDICATOR FOR MOTOR VEHICLES
Filed July 25, 1934  3 Sheets-Sheet 3
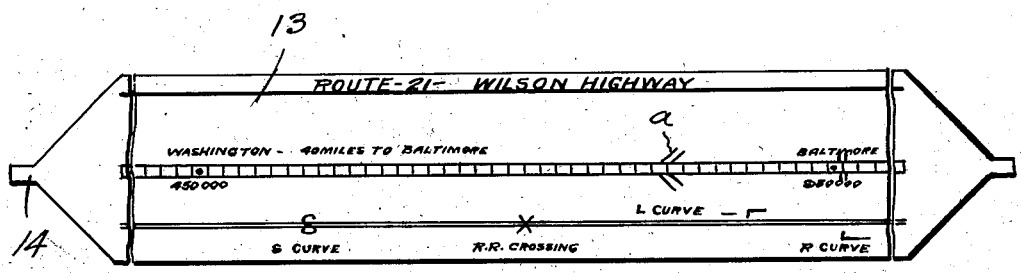
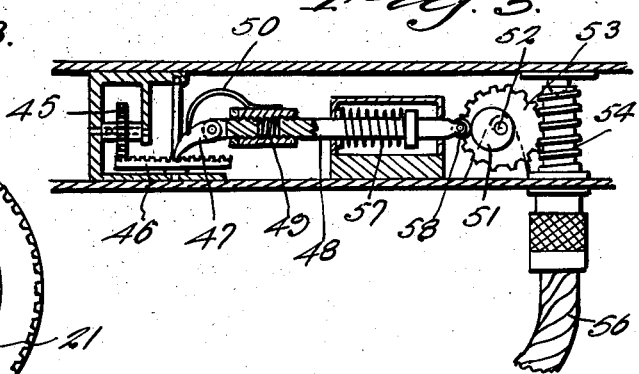
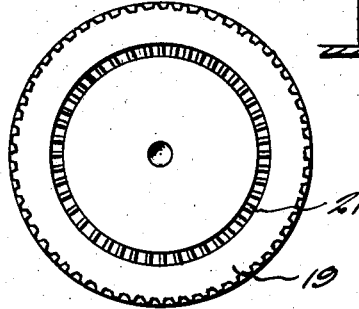
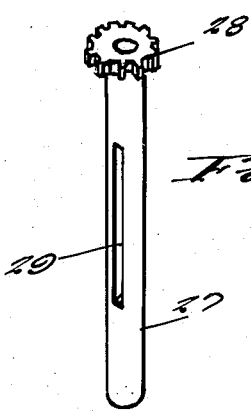
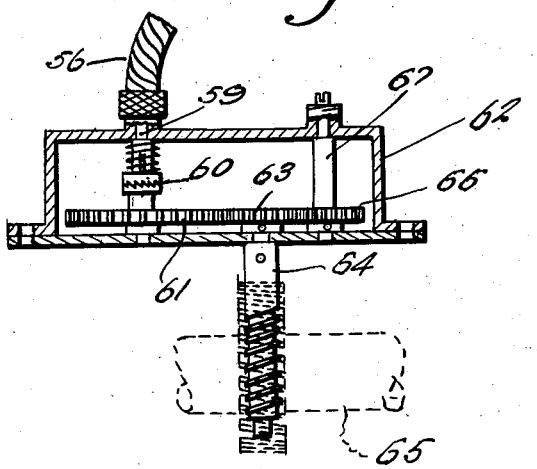
Inventor
BEAUFORD HAROLD DICKS
By Clarence A. O'Brien
Attorney Patented Apr. 23, 1935

1,998,535

UNITED STATES PATENT OFFICE 1,998,535

ROUTE INDICATOR FOR MOTOR VEHICLES

Beauford Harold Dicks, Waupun, Wis.

Application July 25, 1934, Serial No. 736,924

4 Claims. (Cl. 40—42)

This invention relates to a route indicator for motor vehicles, the general object of the invention being to provide means operated by a moving part of the vehicle for indicating to an occupant of the vehicle the towns and cities on his route and the curves, railroad crossings, intersections of other roads and the like so that he will know beforehand the conditions, towns and cities, etc. he is approaching.

Another object of the invention is to provide adjusting means for causing the strip map to operate accurately in accordance with the vehicle on which it is placed.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings, wherein like characters denote like or corresponding parts throughout the several views, and in which:—

Fig. 1 is a front view of the device.

Fig. 2 is a vertical sectional view therethrough.

Fig. 3 is a section on line 3—3 of Fig. 1 with the spools shown in plane view.

Fig. 4 is a section on line 4—4 of Fig. 2.

Fig. 5 is a fragmentary vertical sectional view showing the means operated by the drive shaft for actuating the device.

Fig. 6 is a fragmentary view showing the adjusting means.

Fig. 7 is a bottom plane view of the speed change gear.

Fig. 8 is a sectional view through said gear.

Fig. 9 is a view of the shaft on which the gear is placed.

Fig. 10 is a vertical sectional view showing the means for driving the speedometer shaft and the drive shaft of the invention from a rotary shaft of the vehicle.

Fig. 11 is a face view of the map.

Fig. 12 is a bottom plane view of the spool gear.

Fig. 13 is a detail sectional view showing the detent for holding the manually-operated shaft in raised or lowered position.

Fig. 14 shows a detent for holding the manually operated adjusting shaft in either of two positions.

In these drawings, the numeral 1 indicates a casing or housing which is located in an outer casing or housing 2 and the numeral 3 indicates a small casing located in the casing 2 under the casing 1. The casing 2 is formed with a bottom 4 and said casing 2 is provided with the front door 5 which is hinged as at 6 to a small lower door 7 which is hinged to the front of the casing 2 as at 8, latch means 9 holding the doors in closed position. Upon opening the two doors, each of the casings 1 and 3 can be removed from the casing 2 after the bolts 10 have been removed, these bolts connecting the ends of the casing 2 with the ends of the casing 1, as shown in Fig. 2. A spring latch means 11 holds the small door 7 in closed position as shown in Fig. 4.

The casing 1 contains the spools 12 for the map strip 13, the strip having tabs 14 at its ends for fitting in the slots 15 in the spools. A bearing stud 16 is provided for the lower end of each spool as shown in Fig. 12, the bearing studs being carried by the bottom of the casing 1. Upper bearing studs 17 are carried by springs 18 attached to the top of the casing 1 for the tops of the spools so that by lifting the springs after the casing 1 has been withdrawn from the casing 2, the spools can be removed.

The lower flange 19 of each spool is formed with the gear teeth 20 and with a ring gear 21 in its lower face. A rotatably supported gear 22 extends into the casing 1 from the casing 3 for meshing with the ring gear 21 of the member 19 and these gears 22 are adapted to be rotated to manually move the spools by means of the shafts 23 having the crown gears 24 thereon, each shaft 23 passing through the front of the casing 2 and having a knob 26 at its outer end. Thus, by pushing the shafts inwardly and then rotating them, the map can be adjusted on the spools. A spring pressed detent 27' shown in Figure 14, holds each shaft 23 in either one of its two positions.

A shaft 27 is rotatably supported in the casing 3 and has a pinion 28 at its upper end for engaging the gear teeth 20 of one of the spools and said shaft has a longitudinally extending slot 29 therein for receiving a pin carried by a gear 30 on the shaft so that said gear 30 can be raised and lowered by means of the manually operated rocking rod 31 which projects from the front of the casing 2 with its inner end engaging a groove in the hub of the gear 30. A spring detent 32 holds the rod 31 in either one of its two positions.

A gear 33 is slidably arranged on a shaft 34 in the casing 3 and meshes with the gear 30, said gear 33 having a groove 35 in its hub part which is engaged by a forked rocking rod 35' so that this gear 33 can be raised and lowered.

The underface of this gear 33 is provided with a plurality of annular rows of gear teeth 36 as shown in Fig. 7 and any of these rows of gear teeth is adapted to be engaged with a gear 37 slidably but non-rotatably arranged on a shaft 38 journaled in the casing 3, and this gear 37 has a grooved hub 39 engaged by a fork on a shaft having a knob 40 thereon which extends from the device, said knob having a pointer 41 thereon for moving over the graduation 42 on a post 43 so that by turning the knob 40, the gear 37 can be placed in mesh with any one of the annular rows of gear teeth 36 of the gears 33 in order to adjust the speed of movement of the map in accordance with the vehicle on which it is placed. Fig. 6 shows the graduation marks to indicate different sizes of tires.

A pinion 43 is connected with the shaft 38 and meshes with an idle pinion 44 which in turn meshes with a pinion 45 which meshes with a gear 46 actuated by a dog 47 pivoted to a push rod 48, as shown in Fig. 5. The push rod is formed of two sections adjustably connected together by a threaded sleeve 49 and a spring 50 acts to hold the dog 47 in engagement with the teeth of the gear 46. The push rod is actuated from a cam 51 carried by a shaft 52 having a worm gear 53 thereon which meshes with the worm 54 on a drive shaft located in a casing 56. A spring 57 holds the push rod with its roller 58 against the cam. The drive shaft 59 which passes through the casing 56 has a clutch means 60 for connecting it to a gear 61 located in the housing 62 and this gear 61 meshes with a pinion 63 attached to a worm shaft 64 driven from a rotary shaft 65 of the vehicle. Pinion 63 also meshes with a pinion 66 attached to a shaft 67 which is adapted to be connected to the speedometer shaft of the vehicle.

As shown in Fig. 11, the map has thereon the route, the names of the various towns and cities through which the route passes, the population of the cities and the distances between the cities. The map also has the intersections $a$ of other roads with the main road and also data showing road crossings and the curves in the route, all as shown in Fig. 11. The strip map passes over the guide rolls 68 which guide the map in rear of a window 69 in the door 5 and springs 70 carried by the door press the map against the rollers to prevent the map from having too free movement.

The map can contain advertising matter and it will of course be understood that any suitable data may be placed on the map to indicate the condition of the road ahead.

From the foregoing, it will be seen that I have provided means whereby the operator of the vehicle will know what cities, towns and the like are ahead of him and also the condition of the roads, such as curves, railroad crossings, intersections and the like and that the device can be adjusted in accordance with the vehicle on which it is placed.

It will be seen that the shaft 52 is driven from a suitable part of the vehicle and the cam 51 imparts a step-by-step movement to the gear 46 by means of the dog 47 and this gear 46 through means of the pinion shown in Fig. 4 rotates the shaft 38 which imparts movement to the gear 37 and this gear rotates the gear 33 at a speed in accordance with which annular row of gear teeth 36 the gear 37 is in mesh with. The gear 33 rotates the gears 30 and by means of the gear 28, one of the spools is rotated. The map strip can be adjusted whenever desired by means of the manually operated shafts 23. When it is desired to adjust the speed of the gear 33, the gears 30 and 33 are raised and the gear 37 adjusted and then the gears 33 and 30 are lowered so that they will mesh together and with the gear 37.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:—

1. A route indicator for a vehicle comprising a casing having a window therein, a pair of spools rotatably arranged in the casing, a map strip having its ends connected with the spools with part of the strip located in rear of the window, the lower part of one spool having a gear thereon, a gear meshing with the first mentioned gear, a shaft carrying the gear, a pinion on the shaft, a gear meshing with the pinion, said gear having a plurality of annular rows of gear teeth on one face thereof, a shaft, a pinion slidably arranged thereon meshing with any one of the row of teeth, manually operated means for adjusting the pinion, and means for rotating the pinion-carried shaft from a movable part of the vehicle.

2. A route indicator for a vehicle comprising a casing having a window therein, a pair of spools rotatably arranged in the casing, a map strip having its ends connected with the spools with part of the strip located in rear of the window, the lower part of one spool having a gear thereon, a gear meshing with the first mentioned gear, a shaft carrying the gear, a pinion on the shaft, a gear meshing with the pinion, said gear having a plurality of annular rows of gear teeth on one face thereof, a shaft, a pinion slidably arranged thereon meshing with any one of the row of teeth, manually operated means for adjusting the pinion, and means for rotating the pinion-carried shaft from a movable part of the vehicle, such means including a shaft driven from a movable part of the vehicle, a cam shaft rotated from the driven shaft, a cam on said shaft, a push rod operated by the cam, a dog carried by the push rod, a gear operated by the dog, and means for transmitting the movements of the gears to the pinion-carried shaft.

3. A route indicator for a vehicle comprising a casing having a window therein, a pair of spools rotatably arranged in the casing, a map strip having its ends connected with the spools with part of the strip located in rear of the window, the lower part of one spool having a gear thereon, a gear meshing with the first mentioned gear, a shaft carrying the gear, a pinion on the shaft, a gear meshing with the pinion, said gear having a plurality of annular rows of gear teeth on one face thereof, a shaft, a pinion slidably arranged thereon meshing with any one of the rows of teeth, manually operated means for adjusting the pinion, and means for rotating the pinion-carried shaft from a movable part of the vehicle, such means including a shaft driven from a movable part of the vehicle, a cam shaft rotated from the driven shaft, a cam on said shaft, a push rod operated by the cam, a dog carried by the push rod, a gear operated by the dog, and means for transmitting the movements of the gears to the pinion-carried shaft, said push rod being formed in sections adjustably connected together.

4. A route indicator for a vehicle comprising a casing having a window therein, a pair of spools rotatably arranged in the casing, a map strip having its ends connected with the spools with part of the strip located in rear of the window, the lower part of one spool having a gear thereon, a gear meshing with the first mentioned gear, a shaft carrying the gear, a pinion on the shaft, a gear meshing with the pinion, said gear having a plurality of annular rows of gear teeth on one face thereof, a shaft, a pinion slidably arranged thereon meshing with any one of the rows of teeth, manually operated means for adjusting the pinion, and means for rotating the pinion-carried shaft from a movable part of the vehicle, such means including a shaft driven from a movable part of the vehicle, a cam shaft rotated from the driven shaft, a cam on said shaft, a push rod operated by the cam, a dog carried by the push rod, a gear operated by the dog, and means for transmitting the movements of the gears to the pinion-carried shaft, said push rod being formed in sections adjustably connected together, a pair of manually rotated shafts in the casing having parts projecting therefrom, parts of the spools having gear teeth thereon, pinions meshing with said gear teeth, and a crown gear on each manually operated shaft for engaging the pinion last mentioned, said manually operated shafts being supported for sliding movement and detents for holding the shafts in adjusted position.

BEAUFORD HAROLD DICKS.